United States Patent Office 3,095,446
Patented June 25, 1963

3,095,446
HALOALKYLANILINE DISULFONYL CHLORIDES
Richard Bennett Margerison, Florham Park, Anthony Charles Shabica, Livingston, and John Benjamin Ziegler, Summit, N.J., assignors to Ciba Corporation, a corporation of Delaware
No Drawing. Filed May 12, 1959, Ser. No. 812,579
2 Claims. (Cl. 260—543)

This invention concerns a new process for the preparation of certain 3,4-dihydro-2H-1,2,4-benzothiadiazine-1,1-dioxides. More particularly, it relates to process for the preparation of 7-sulfamyl-3,4-dihydro-2H-1,2,4-benzothiadiazine-1,1-dioxides, in which the nitrogen atom of the sulfamyl group may be unsubstituted or substituted. In addition to the sulfamyl group the carbocyclic portion may contain in the 6-position a radical $R_3$, which stands for lower alkyl, polyhalogeno-lower alkyl, or particular halogen.

The preparation of the 3,4-dihydro-2H-1,2,4-benzothiadiazine-1,1-dioxides according to the process of this invention includes particularly the manufacture of 7-N-$R_2'$ - sulfamyl - 2 - $R_2'$ - 3 - $R_1$ - 4 - $R_2''$ - 6 - $R_3$ - 3,4-dihydro - 2H - 1,2,4 - benzothiadiazine - 1,1 - dioxides, in which $R_1$ represents hydrogen, lower alkyl, substituted lower alkyl, lower alkenyl, cycloalkyl, cycloalkenyl, carbocyclic, aryl, substituted carbocyclic aryl, heterocyclic aryl or heterocyclic-lower alkyl, each of the radicals $R_2'$ and $R_2''$ stands for hydrogen or lower alkyl and $R_3$ has the above-given meaning. These compounds may, therefore, be represented by the following formula:

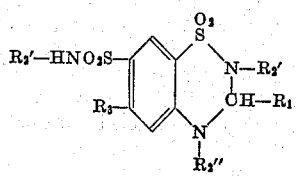

in which $R_1$, $R_2'$, $R_2''$ and $R_3$ have the above-given meaning. The present invention includes also the preparation of alkali metal salts of the above compounds whenever prepared according to the process of this invention.

Apart from being hydrogen, $R_1$ may also stand for lower alkyl, e.g. methyl, ethyl, propyl, isopropyl, butyl, isobutyl, secondary butyl, tertiary butyl, pentyl, isopentyl or neopentyl. The substituents of substituted lower alkyl radicals are particularly halogen, e.g. fluorine, chlorine or bromine atoms; halogeno-lower alkyl radicals are, therefore, represented, for example, by trifluoromethyl, chloromethyl, dichloromethyl, trichloromethyl, bromomethyl or 2-chloroethyl. Other substituents are, for example, hydroxyl, etherified hydroxyl, such as lower alkoxy, e.g. methoxy or ethoxy, or monocyclic carbocyclic aryloxy, e.g. phenoxy, lower alkanoyl, e.g. acetyl, or amino, especially tertiary amino, such as N,N-di-lower alkyl-amino, e.g. dimethylamino or diethylamino.

A lower alkenyl radical representing $R_1$ is, for example, 1-propenyl; cycloalkyl and cycloalkenyl radicals have preferably from five to six carbon atoms and may be represented, for example, by cyclopentyl, cyclohexyl or 3-cyclohexenyl.

Carbocyclic aryl radicals are primarily monocyclic carbocyclic aryl, e.g. phenyl and substituted phenyl, whereas carbocyclic aryl-lower alkyl may be represented by monocyclic carbocyclic aryl-lower alkyl, e.g. benzyl or 2-phenylethyl or the corresponding substituted carbocyclic aryl-lower alkyl radicals. Substituents are, for example, lower alkyl, e.g. methyl or ethyl, halogens, e.g. fluorine, chlorine or bromine, lower alkoxy, e.g. methoxy or ethoxy, lower alkylenedioxy, e.g. methylenedioxy, lower alkyl-mercapto, e.g. methylmercapto or ethylmercapto, amino, particularly tertiary amino, such as di-lower alkylamino, e.g. dimethylamino.

Heterocyclic aryl radicals are primarily monocyclic heterocyclic aryl radicals, which contain nitrogen, sulfur or oxygen as hetero atoms of the heterocyclic nucleus; such radicals are, for example, pyridyl, e.g. 3- or 4-pyridyl, thienyl, e.g. 2-thienyl, or furyl, e.g. 2-furyl. Heterocyclic aryl-lower alkyl radicals are primarily monocyclic heterocyclic aryl-lower alkyl radicals, in which the heterocyclic radical may be identical with those previously hereinabove; the 2-thenyl radical represents such a substituent $R_1$.

The radicals $R_2'$ and $R_2''$, apart from representing primarily hydrogen, may stand for lower alkyl, e.g. methyl or ethyl.

The radical $R_3$ stands primarily for halogen, e.g. fluorine, bromine, iodine, or particularly chlorine. It may also represent lower alkyl, e.g. methyl or ethyl, or halogeno-lower alkyl, e.g. trifluoromethyl.

Salts of compounds prepared according to the process of this invention are therapeutically useful salts with metals, particularly the alkali metal salts, such as those with sodium or potassium. Mono- or polysalts may be formed.

The 3,4-dihydro-2H-1,2,4-benzothiadiazine-1,1-dioxides formed by the new process of this invention show diuretic and natriuretic effects and may be used as diuretic and natriuretic agents to relieve excessive water and/or salt retention, for example, in connection with heart or kidney diseases. They also have antihypertensive effects, which may be utilized to relieve states of hypertension.

3,4 - dihydro - 2H - 1,2,4 - benzothiadiazine - 1,1 - dioxides may be prepared by treating an aniline compound of the formula:

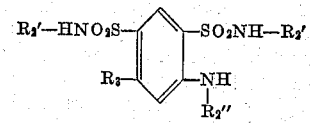

in which $R_2'$, $R_2''$ and $R_3$ have the above-given meaning, with an aldehyde of the formula $R_1CHO$, in which $R_1$ has the above-given meaning, or a derivative of such an aldehyde. The starting materials used in this reaction are prepared by treating a 3-$R_3$-N-$R_2''$-aniline with chlorosulfonic acid to form the 5-$R_3$-N-$R_2''$- aniline-2,4-disulfonyl chloride, which is then reacted with ammonia, preferably in the form of aqueous ammonium hydroxide or liquid ammonia, or with a primary amine, for example, a lower alkylamine, e.g. methylamine or ethylamine.

An additional possibility for preparing compounds of this invention comprises reducing in 1,2,4-benzothiadiazine compounds of the formulae:

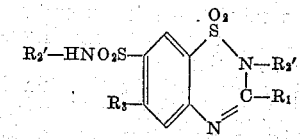

or

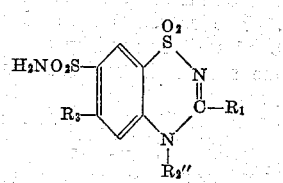

in which $R_1$, $R_2'$, $R_2''$ and $R_3$ have the above-given meaning, the C=N-double bond of the 1,2,4-thiadiazine portion. Such reduction may be carried out, for example, by treatment with an alkali metal borohydride, e.g. sodium borohydride. Certain starting materials used in this reaction, for example, those, in which $R_1$ stands for hydrogen, may be prepared by treating a 3-$R_3$-N-$R_2''$-aniline with chlorosulfonic acid, reacting the resulting 5-$R_3$-N-$R_2''$-aniline-2,4-disulfonyl chloride with ammonia or a primary amine as described above and ring-closing the resulting 2,4-disulfamyl-5-$R_3$-N-$R_2''$-aniline with formic acid or a lower alkyl orthoformate, e.g. ethyl orthoformate, to the desired 1,2,4-benzothiadiazine-1,1-dioxides.

We have now found that the 3,4-dihydro-2H-1,2,4-benzothiadiazine-1,1-dioxides described hereinabove can be prepared from 5-$R_3$-N-$R_2''$-aniline-2,4-disulfonyl chlorides directly and without isolating a 2,4-disulfamyl-aniline derivative. This may be achieved by reacting an aniline compound of the formula:

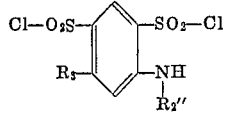

in which $R_2''$ and $R_3$ have the above-given meaning, with an aldehyde of the formula $R_1$—CHO, in which $R_1$ has the above-given meaning, or a reactive derivative thereof in the presence of hydrogen chloride, and subsequently with a compound of the formula $R_2'$—$NH_2$, in which $R_2'$ has the above-given meaning, and, if desired, resplacing in any resulting 3,4-dihydro-2H-1,2,4-benzothiadiazine-1,1-dioxide containing sulfamyl-nitrogens with hydrogens, such hydrogen atom by lower alkyl radical, and/or, if desired, converting a resulting salt into a free compound, and/or, if desired, converting a free compound into a salt thereof.

The reaction is preferably carried out in the presence of a solvent, for example, an organic solvent, such as an ether, e.g. diethyleneglycol dimethylether, p-dioxane or tetrahydrofuran, an aromatic hydrocarbon, e.g. benzene or toluene, a halogenated lower aliphatic hydrocarbon, e.g. tetrachloroethane, or any other analogous solvent, which is inert towards an aldehyde in the presence of an acid and/or in which the reactants are soluble.

The aldehyde of the formula $R_1$—CHO, in which $R_1$ has the above-given meaning, may be used as such or in the form of a derivative thereof, such as, for example, as an acetal with a lower alkanol, e.g. methanol or ethanol. Formaldehyde itself may be used in the form of a reactive derivative thereof, such as a polymer, e.g. trioxane or paraformaldehyde, or an acetal, e.g. dimethoxymethane or diethoxymethane, or in the form of any other source furnishing formaldehyde, such as, for example, hexamethylenetetramine or chlormethyl methyl ether. Hydrogen chloride is preferably used in gaseous form and, if necessary, in an excess amount in order to assure the formation of an intermediarily formed N-chloro-alkylated aniline derivative. The reaction may be performed under cooling, at room temperature or at an elevated temperature, for example, at the boiling temperature of the solvent. It is preferably performed in the absence of water; traces of the latter, however, do not influence the reaction.

The second reactant of the formula $R_2'$—$NH_2$, in which $R_2'$ has the above-given meaning, may be added to the reaction mixture in gaseous form, or in solution, for example, in one of the solvents used in the first phase of the reaction. The solvent employed during the latter may be removed and replaced by another diluent; however, the same solvent is preferably used during both stages.

The treatment with the reagent of the formula $$R_2'—NH_2$$

may be carried out under cooling, at room temperature or at an elevated temperature. Prior to the treatment of the reaction mixture with the reactant $R_2'$—$NH_2$, an excess of hydrogen chloride may preferably be removed, in order to avoid a loss of the reactant by neutralization with the acid. This removal may be accomplished, for example, by elevating the temperature and/or reducing the pressure in the reaction vessel.

The product obtained according to the process of this invention may be isolated and purified according to ordinary isolation procedures, for example, precipitation, crystallization and/or recrystallization.

A preferred embodiment of this invention, which is directed to the formation of 3,4-dihydro-2H-1,2,4-benzothiadiazine-1,1-dioxides of the formula:

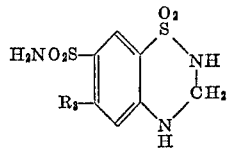

in which $R_3$ stands for methyl, trifluoromethyl, or halogen, particularly chlorine, comprises treating a compound of the formula:

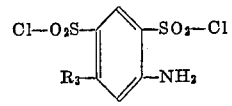

in which $R_3$ has the above-given meaning, with formaldehyde, especially in the form of a polymer thereof, e.g. paraformaldehyde, in the presence of hydrogen chloride and then with ammonia, preferably after the removal of an excess of hydrogen chloride. For example, by reacting 5-chloro-aniline-2,4-disulfonyl chloride with paraformaldehyde in the presence of hydrogen chloride at room temperature, removing the excess of hydrogen chloride and treating the reaction mixture with ammonia at room temperature, the desired 6-chloro-7-sulfamyl-3,4-dihydro-2H-1,2,4-benzothiadiazine-1,1-dioxides can be obtained in excellent yields.

In resulting 3,4-dihydro-2H-1,2,4-benzothiadiazine-1,1-dioxides, containing sulfamyl-nitrogens with hydrogen, such hydrogen may be replaced by lower alkyl. Generally an alkali metal salt of the starting material is formed and such salt is then reacted with the reactive ester of a lower alkanol. These esters are particularly those of lower alkanols, e.g. ethanol, or particularly methanol, with strong mineral acids, such as hydrohalic acids, e.g. hydrochloric, hydrobromic or hydriodic acid, or sulfuric acid. For example, treatment of the starting material with a di-lower alkyl sulfate, such as, for example, dimethyl sulfate or diethyl sulfate, in the presence of an alkaline reagent, such as an alkali metal hydroxide, e.g. lithium, sodium or potassium hydroxide, is a preferred procedure. As solvents, water or water miscible organic solvents, such as lower alkanols, e.g. methanol, ethanol, propanol, isopropanol or tertiary butanol, ethers, e.g. diethyleneglycol dimethylether, or formamides, e.g. dimethylformamide, may be used.

Generally, the alkylation reaction may be carried out under cooling, at room temperature, or at an elevated temperature, if necessary, in a closed vessel, e.g. sealed tube, under pressure and/or in the atmosphere of an inert gas, e.g. nitrogen.

An N-unsubstituted sulfamyl group attached to the carbocyclic portion of the molecule may simultaneously be alkylated; if necessary, this may be prevented to a great extent by varying the conditions and/or the molar ratios of the reactants. A resulting mixture of products may be separated into the single components, for example, by fractionated crystallization, utilizing the differing solubilities in different solvent systems.

The resulting product may be obtained in the form of the free compound or as a salt thereof. An alkali metal salt may be converted into the free compound by treatment with an aqueous acidic reagent, such as a mineral acid, for example, hydrohalic acid, e.g. hydrochloric acid, or sulfuric acid. A free compound may be converted into an alkali metal salt, for example, by treatment with an alkali metal hydroxide, e.g. sodium or potassium hydroxide, in a solvent, such as in a lower alkanol, e.g. methanol or ethanol, or in water and evaporating the solvent; or by reacting the free compound, for example, in an ether, e.g. p-dioxane or diethyleneglycol dimethylether, solution, with an alkali metal hydride or amide, e.g. sodium or potassium hydride or amide, and removing the solvent. Mono- or poly-salts may be obtained.

The invention also comprises any modification of the general process wherein a compound resulting as an intermediate at any stage of the process of the invention, is used as starting material and reaction with the remaining reactant carried out, as well as any new intermediates. Thus, intermediates of the formula:

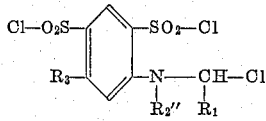

in which $R_1$, $R_2''$ and $R_3$ have the above-given meaning, and which are formed by treating the 5-$R_3$-N-$R_2''$-aniline-2,4-disulfonyl chloride with an aldehyde of the formula $R_1CHO$ in the presence of hydrogen chloride, and their acid addition salts, particularly those with hydrochloric acid, are new and are intended to be included within the scope of the invention. They can be used as intermediates for the preparation of the 3,4-dihydro-2H-1,2,4-benzothiadiazine-1,1-dioxides hereinbefore described to have diuretic and natriuretic properties; this may be achieved by treatment with a reagent of the formula $R_2'$—$NH_2$, in which $R_2'$ has the above-given meaning, according to the above-given directions. Particularly suitable as intermediates are the compounds of the formula:

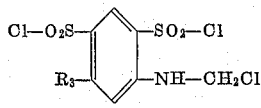

in which $R_3$ stands for methyl, trifluoromethyl or halogen, particularly chlorine. 5-chloro-N-chloromethyl-aniline-2,4-disulfonyl chloride represents this group of compounds.

The present application is a continuation-in-part application of our application Serial No. 763,806, filed September 29, 1958 (now abandoned), which in turn is a continuation-in-part application of our application Serial No. 752,165, filed July 31, 1958 (now abandoned).

The following examples illustrate the invention; they are not to be construed as being limitations thereon. Temperatures are given in degrees centigrade.

Example 1

Gaseous hydrogen chloride is bubbled through a stirred suspension of 0.46 g. of paraformaldehyde in a solution of 5.0 g. of 5-chloro-aniline-2,4-disulfonyl chloride in 25 ml. of diethyleneglycol dimethylether for one hour at room temperature. The resulting solution is heated to 50° for ten minutes. The excess gaseous hyrogen chloride is removed under reduced pressure leaving the solution of the intermediarily formed 5-chloro-N-chloromethyl-aniline-2,4-disulfonyl chloride in diethyleneglycol dimethylether.

Anhydrous ammonia is passed through that solution while stirring and cooling until the reaction mixture is basic. It is warmed to 45°, filtered to remove the precipitated ammonium chloride, and the 6-chloro-7-sulfamyl-3,4-dihydro-2H-1,2,4-benzothiadiazine-1,1-dioxide is precipitated by concentrating the filtrate under reduced pressure and adding 35 ml. of water. The crude product is recrystallized from aqueous methanol, M.P. 267–272°.

By reacting 5-methyl-aniline-2,4-disulfonyl chloride with paraformaldehyde in the presence of hydrogen chloride and subsequently with ammonia, the 6-methyl-7-sulfamyl - 3,4 - dihydro-2H-1,2,4-benzothiadiazine-1,1-dioxide may be formed.

Example 2

A solution of 10 g. of 5-chloro-aniline-2,4-disulfonyl chloride and 2.48 g. of chloromethyl methyl ether in 70 ml. of diethyleneglycol dimethylether, kept between 20° and 30°, is treated with hydrogen chloride gas while stirring. After one hour the temperature is raised to 50° during a ten minute period; the reaction mixture is then cooled and kept at room temperature while dry air is bubbled through the solution during twenty-five minutes and while a partial vaccum is kept in the reaction vessel.

The solution is cooled in an ice-bath and gaseous ammonia is passed through the solution at temperatures between 10° and 30° for about fifty-five minutes. The now basic reaction mixture is allowed to stand for one hour, the precipitate, consisting largely of ammonium chloride is filtered off and washed with an additional 30 ml. of diethyleneglycol dimethylether. About 60 ml. of the solvent is evaporated from the combined filtrates, the residue is diluted with 70 ml. of water and the solid precipitate, containing the 6-chloro-7-sulfamyl-3,4-dihydro-2H-1,2,4-benzothiadiazine-1,1-dioxide is filtered off. The product, obtained after recrystallization from a mixture of water and methanol, is identical with the product described in Example 1.

What is claimed is:

1. A member of the group consisting of compounds of the formula:

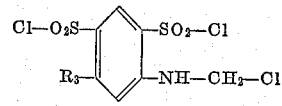

in which $R_3$ represents a member of the group consisting of lower alkyl, trifluoromethyl and halogen, and the acid addition salt thereof with hydrochloric acid.

2. 5 - chloro - N - chloromethyl-aniline-2,4-disulfonyl chloride.

References Cited in the file of this patent

UNITED STATES PATENTS

| | | |
|---|---|---|
| 2,809,194 | Novello | Oct. 8, 1957 |
| 2,910,473 | Novello | Oct. 27, 1959 |
| 2,910,476 | Novello | Oct. 27, 1959 |
| 2,961,463 | Novello | Nov. 22, 1960 |
| 2,965,675 | Novello | Dec. 20, 1960 |

FOREIGN PATENTS

| | | |
|---|---|---|
| 96,851 | Germany | Jan. 15, 1895 |